(12) United States Patent
Philip

(10) Patent No.: US 9,419,516 B2
(45) Date of Patent: Aug. 16, 2016

(54) DC-DC VOLTAGE CONVERTER AND CONVERSION METHOD

(71) Applicant: NXP B.V., Eindhoven (NL)

(72) Inventor: Melaine Philip, Blainville-sur-Orne (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/565,375

(22) Filed: Dec. 9, 2014

(65) Prior Publication Data

US 2015/0207404 A1    Jul. 23, 2015

(30) Foreign Application Priority Data

Dec. 11, 2013   (EP) .................................... 13290310

(51) Int. Cl.
| | | |
|---|---|---|
| H04B 1/40 | (2015.01) | |
| H02M 3/07 | (2006.01) | |
| H02M 1/44 | (2007.01) | |
| H02M 3/158 | (2006.01) | |
| H02M 1/00 | (2006.01) | |

(52) U.S. Cl.
CPC ........ *H02M 3/07* (2013.01); *H02M 1/44* (2013.01); *H02M 3/158* (2013.01); *H04B 1/40* (2013.01); *H02M 2001/0041* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,107,862 | A * | 8/2000 | Mukainakano | H02M 3/07 327/536 |
| 6,819,163 | B1 * | 11/2004 | Gregoire, Jr. | G05F 3/262 327/536 |
| 7,375,992 | B2 * | 5/2008 | Mok | H02M 3/07 363/60 |
| 8,629,935 | B2 * | 1/2014 | Kikuchi | H04N 5/23241 348/241 |
| 2002/0034082 | A1 * | 3/2002 | Yokomizo | H02M 3/07 363/16 |
| 2003/0038669 | A1 * | 2/2003 | Zhang | H02M 3/07 327/536 |
| 2010/0127739 | A1 * | 5/2010 | Ebuchi | H03L 7/0898 327/148 |
| 2011/0130093 | A1 * | 6/2011 | Walley | G06K 7/10207 455/41.1 |
| 2013/0105586 | A1 * | 5/2013 | Sykko | H05K 13/00 235/492 |
| 2013/0194031 | A1 * | 8/2013 | Poulton | H04L 25/0272 327/536 |
| 2013/0195291 | A1 * | 8/2013 | Josefsson | H02M 3/07 381/174 |
| 2014/0281383 | A1 * | 9/2014 | Dally | G06F 15/7864 712/42 |
| 2015/0145495 | A1 * | 5/2015 | Tournatory | H02M 3/156 323/282 |

FOREIGN PATENT DOCUMENTS

| | | |
|---|---|---|
| EP | 1 111 763 A2 | 6/2001 |
| EP | 2712072 A1 | 3/2014 |

OTHER PUBLICATIONS

Li, P. et al. "A 90-240 MHz Hysteretic Controlled DC-DC Buck Converter With Digital Phase Locked Loop Synchronization", IEEE Journal of Solid-State Circuits, vol. 46, No. 9, pp. 2108-2119 (Sep. 2011).

Extended European Search Report for Patent Appln No. 13290310.5 (May 6, 2014).

* cited by examiner

*Primary Examiner* — Cindy Trandai

(57) ABSTRACT

A DC-DC converter comprises a capacitor arrangement and a switching arrangement for controlling coupling of the capacitor arrangement to a converter input during a loading phase and to a converter output during a storing phase. The converter cycles between charge pumping stages and charge holding phases, giving rise to a converter switching frequency. A variable output load is controlled thereby to maintain a constant converter switching frequency.

18 Claims, 6 Drawing Sheets

DC-DC VOLTAGE CONVERTER AND CONVERSION METHOD

CROSS-REFERENCE TO RELATED APPLICATIONS

This application claims the priority under 35 U.S.C. §119 of European patent application no. 13290310.5, filed on Dec. 11, 2013, the contents of which are incorporated by reference herein.

FIELD

This application relates to DC-DC voltage converters, for creating a regulated voltage output from a voltage input, which input voltage may vary. The output voltage can have a higher or lower value than the input voltage, and it is stable even though the input voltage and the output load may change.

BACKGROUND

Switching capacitive DC-DC voltage converters typically use "flying capacitors". These capacitors are charged from the input voltage and then discharged to the load thus providing charge transfer and a constant output voltage.

FIG. 1 shows a basic known DC-DC converter circuit.

The circuit comprises a switching capacitor Csw. One terminal is connected to the input through a first switch S1 and to the output through a third switch S3. The other terminal is connected to the input through a fourth switch S4 and to ground through a second switch S2.

Basic DC-DC converters of this type integrate switches S1 to S4 and an oscillator so that the switches work alternately in pairs S1,S2 and S3,S4.

The oscillator is shown as a clock signal Clk, and it is passed to the switches in dependence on whether the output voltage Vout has reached a target voltage Vref. An AND gate 10 controls the passing of the clock signal, and a comparator compares the output voltage (or a voltage derived from the output voltage) with the reference level Vref. The comparator output is used to control whether the AND gate passes the clock signal. The comparator output is thus a control signal PUMP which controls the converter pumping. When it is high, the cyclic charge pumping is enabled, and when it is low, the cycles are halted.

The configuration shown doubles the input voltage.

The DC-DC converter operates in two phases, sequenced by the clock. Closing switches S1 and S2 charges the switching capacitor Csw to the input voltage Vin in a first half cycle (storing phase). In the second half cycle, switches S3 and S4 close and switches S1 and S2 open (loading phase). This action connects the negative terminal of Csw to Vin and connects the positive terminal to Vout. If the voltage across the output load Cload is smaller than that across Csw, charge flows from Csw to Cload.

The storing phase and loading phase occur alternately, boosting the DC-DC converter output voltage until its target value Vref is reached. When Vout reaches Vref, the switching clock is stopped, and then the DC-DC converter stays in the storing phase.

As soon Vout goes below Vref, the DC-DC converter restarts pumping, alternating the storing and loading phases until Vout again rises above Vref.

The DC-DC converter output voltage should be regulated within a voltage window by using a voltage hysteresis of the comparator 12. In this way, Vout is regulated between Vref and Vref+Hyst. The threshold voltage for the Vout rising edge is Vref+Hyst, and the threshold voltage for the falling edge is Vref.

FIG. 2 shows this operation, and shows the voltage waveform of the output voltage Vout, which fluctuates between Vref and Vref+Hyst.

During a start-up time, the DC-DC converter pumps energy from Vin to Vout, and Vout rises to Vref+Hyst. The DC-DC converter then stops by staying in a storing state. This is shown as phase P1, and it corresponds the signal PUMP being low, waiting for the output voltage to drop back to Vref.

During phase P1, Vout falls linearly due to the output load current until Vref, and then the DC-DC converter restarts to boost Vout until Vref+Hyst. This boosting involves alternate loading phases P2 and storing phase P3.

For the basic DC-DC converter topology, assuming a fast DC-DC output rising edge, the DC-DC output switching noise varies with respect to the DC-DC converter output regulation window and the DC-DC load current:

$$FSW_{DCDC} = \frac{ILOAD}{CLOAD \times \Delta V} \quad [1]$$

With:
$FSW_{DCDC}$ is the DC-DC switching frequency
ILOAD is DC-DC converter load current
$\Delta V$ is the output regulation window
CLOAD is the output capacitance of the DC-DC converter.

DC-DC converters of this type have application in many different fields. One example is for near field communication ("NFC") applications, such as RFID applications. NFC systems are for example used for contactless secure communication with a smart card. In this application, an NFC device can operate in card mode or in reader mode.

In card mode, the NFC device acts as a contactless smart card, whereas in reader mode, the NFC device acts as a contactless smart card reader.

When operating in reader mode, the NFC product sends a magnetic field for powering the card (the voltage from the field energy is filtered by the card to generate a supply voltage for the card) and for data exchange between the card and the NFC device. This communication makes use of amplitude modulation.

The NFC front end executes RF polling loops for detecting the card. Once a card is introduced inside the field, data exchanges are performed.

Generally, the card is inserted into the NFC field from top to bottom, as shown in FIG. 3, which shows the reader 30 and card 32. The reader is supplied by a front end 34 through an EMC (electromagnetic compatibility) and matching filter 36.

The main market for this type of contactless NFC device is mobile application. In such customer applications, the NFC circuitry is supplied directly from the mobile battery. These NFC devices should operate over the battery voltage range.

To provide a constant communication distance, the supply voltage of the NFC transmitter should be stable over the battery voltage range. For providing a higher communication distance, the supply voltage of the NFC transmitter should be as high as possible. To meet high and stable communication distance, a DC-DC boost converter is needed for supplying the NFC transmitter from the mobile device battery.

The DC-DC converter for example is embedded on silicon. The stable communication distance can be met using existing circuits, but the operation of the DC-DC converter can induce instability on the NFC communication. When operating, the DC-DC converter generates noise which can disturb the NFC communication. RF degradation can appear if the fundamental component of the DC-DC converter noise is within the RF bandwidth. For NFC applications, the communication bandwidth typically ranges from 100 KHz to 1 MHz.

Thus, the issue of switching noise in the DC-DC converter is of particular concern when the converter is used within an RF circuit such as an NFC device.

FIG. 4 shows as plot 40 a measure of the DC-DC noise frequency based on the distance between the NFC reader antenna and the card (using the right hand y-axis scale). Plot 42 shows the NFC transmitter current consumption (using the left hand y-axis scale).

The left y-axis plots the transmitter current consumption in mA and the right y-axis plots the DC-DC switching frequency in kHz. The x-axis plots the communication distance in mm.

The range 44 represents the NFC bandwidth from 100 kHz to 1 MHz and as shown it includes the DC-DC converter switching noise frequency.

The current consumption of the NFC transmitter increases when the card is closer to the antenna. As it is the load for the DC-DC converter, the DC-DC switching frequency increases. In this example, above 1.5 mm distance, the DC-DC converter switching noise is within the NFC bandwidth and thus able to degrade the RF performance. There is thus a problem that the switching frequency of a basic capacitive DC-DC converter varies with the load current. The DC-DC converter noise frequency is not predictable if the load current is not fixed.

SUMMARY

The invention is defined by the claims.

According to an example, there is provided a DC-DC converter, comprising:
- a capacitor arrangement;
- a switching arrangement for controlling coupling of the capacitor arrangement to a converter input during a loading phase and to a converter output during a storing phase;
- a circuit for controlling the switching arrangement to alternate the loading and storing phases during an output charge stage and to cease alternation between the loading and storing phases during an output hold stage, the cycling between stages giving rise to a converter switching frequency;
- a variable output load; and
- a feedback circuit for controlling the variable output load thereby to maintain a constant converter switching frequency.

This converter enables the switching frequency (between the phases of the converter) to be controlled so as to avoid switching noise at frequencies where it may cause undesirable interference. In this way, there is control of the converter switching frequency by adding a controlled load to the DC-DC converter output.

The feedback circuit can comprise a phase locked loop circuit. For example it can be used to lock the switching frequency to a desired reference by controlling the output load.

The phase locked loop circuit can comprise a phase comparator for comparing a signal which varies in dependence on the converter switching frequency with a reference frequency signal, to derive a control signal for controlling the variable output load. The signal which varies in dependence on the converter switching frequency can comprise a pump control signal which indicates whether or not the converter output has reached a target value. This pump signal controls the cycling of the converter, and is much slower than the individual switch signals, which are instead controlled by a clock signal.

A divider circuit can be provided for deriving the reference frequency signal from the clock signal.

The variable output load can comprise a voltage-controlled current source in parallel with the output load of the converter. By diverting output current from the main output load, the way the output voltage changes is influenced, which in turn influences the switching frequency, thus implementing a feedback control loop.

There is also provided an RF communications circuit, comprising:
- a receiver and/or transmitter circuit; and
- a converter for providing the power supply for the receiver and/or transmitter circuit from a battery. The receiver and/or transmitter circuit can comprise a near field communication circuit.

Preferably the receiver and/or transmitter circuit operate in a frequency range (e.g. 100 kHz to 1 MHz), and the converter switching frequency is outside the frequency range.

There is also provided a DC-DC conversion method, comprising:
- controlling coupling of a capacitor arrangement to a converter input during a loading phase and to a converter output during a storing phase;
- alternating the loading and storing phases during an output charge stage and ceasing alternation between the loading and storing phases during an output hold stage, the cycling between stages giving rise to a converter switching frequency;
- controlling a variable output load thereby to maintain a constant converter switching frequency.

BRIEF DESCRIPTION OF THE DRAWINGS

Examples will now be described in detail with reference to the accompanying drawings, in which.

DETAILED DESCRIPTION

At present, current NFC products for mobile telephone devices do not use embedded DC-DC converters. An external power management unit is required to supply the NFC transmitter in order to provide stable RF performance over the battery voltage range.

Examples provide a DC-DC converter, comprising a capacitor arrangement and a switching arrangement for controlling coupling of the capacitor arrangement to a converter input during a loading phase and to a converter output during a storing phase. The converter cycles between charge pumping stages and charge holding phases, giving rise to a converter switching frequency. A variable output load is controlled thereby to maintain a constant converter switching frequency.

This approach based on regulating the DC-DC switching frequency. By "switching frequency" in this context is meant the switching between the cyclic charge pumping being enabled and being disabled. Thus, it relates to the frequency of the PUMP signal for the example circuit of FIG. 1.

Figure 2:
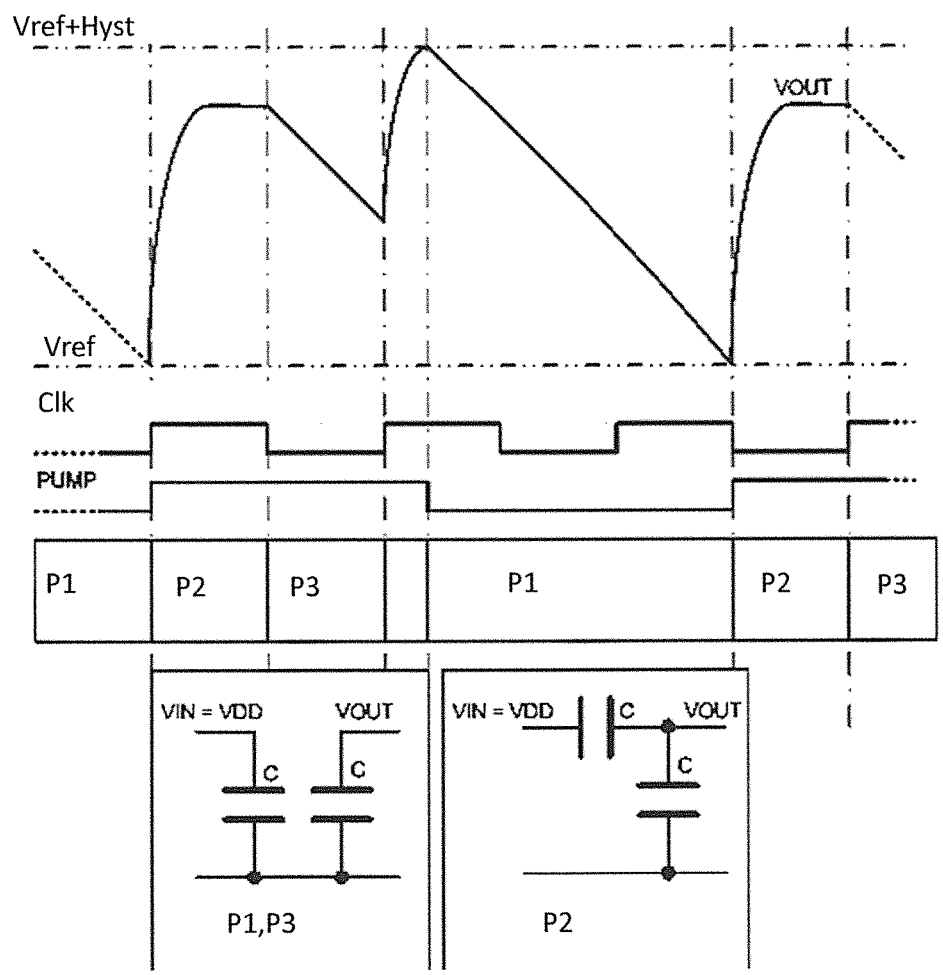
FIG. 2 shows timing diagrams for the circuit of FIG. 1.
Figure 3:
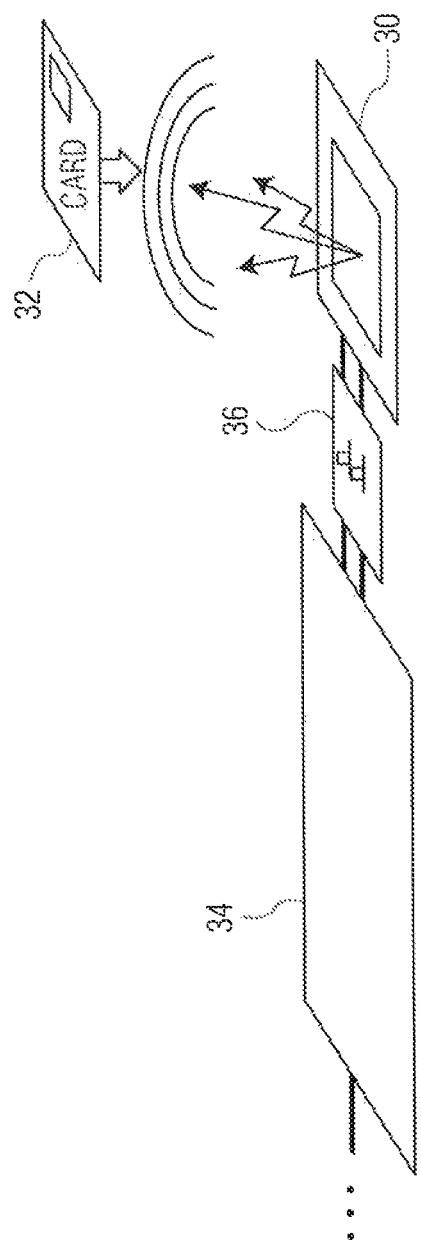
FIG. 3 shows one possible use of a DC-DC converter of the invention.
Figure 4:
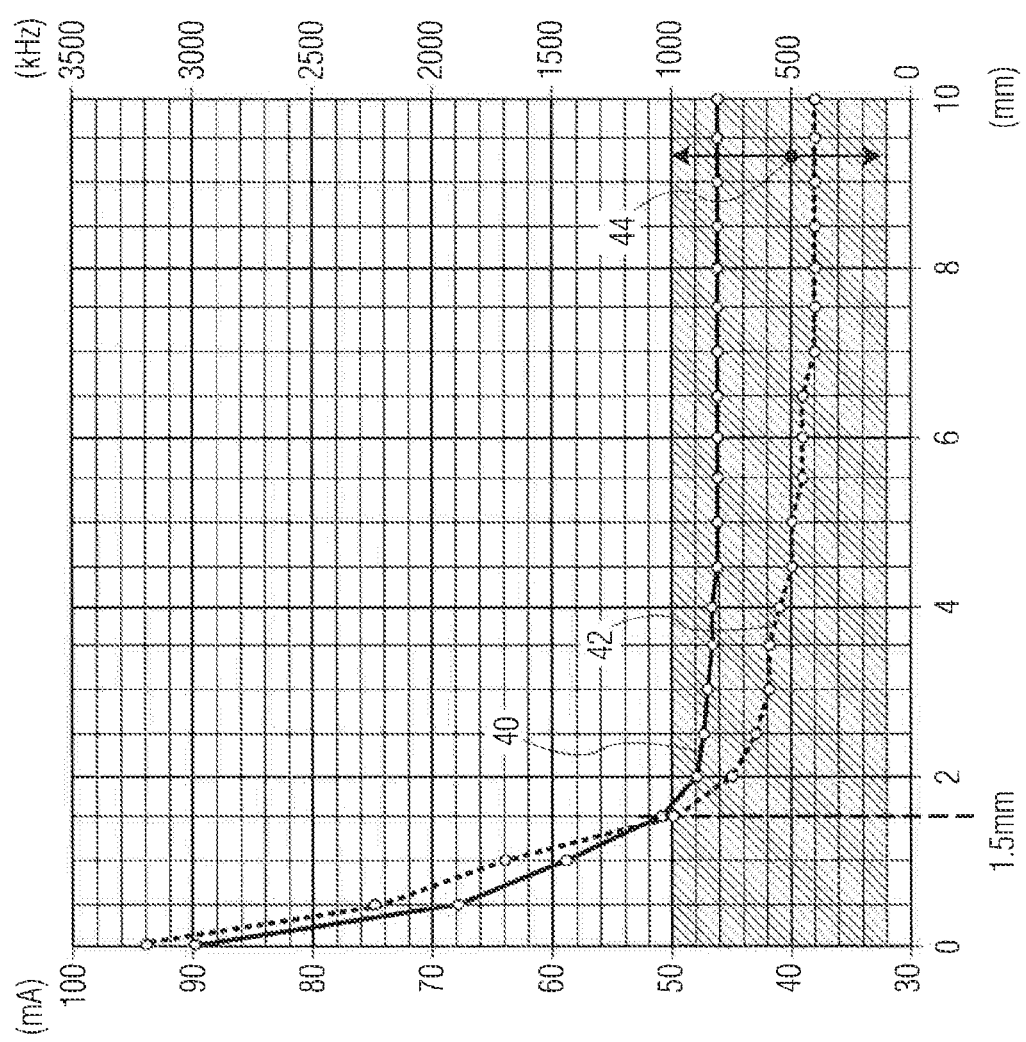
FIG. 4 shows the problem of noise interference in the example of FIG. 3.

The output voltage is of course not a pure sine wave, but as can be seen in FIG. 2, it has a significant component which is synchronised with the signal PUMP. It also has higher frequency components derived from the ripple caused by the phases P2 and P3.

Examples are based on adjusting an additional load provided at the output of the DC-DC converter. This then enables integration of the DC-DC converter with RF communications circuitry, such as NFC circuits.

The applicant has contemplated two implementations to regulate the switching frequency.

A first is to sense the DC-DC converter switching operation, then use a phase locked loop (PLL) to lock to a reference clock signal. The output of the PLL is then a current source loading the DC-DC converter output. This example controls the current provided to the load and thereby influences the load charge time, in such a way as to cause a constant switching frequency.

A second is to sense the DC-DC converter overall load current, then regulate it to a fixed reference current. As the DC-DC converter overall current is fixed, the DC-DC switching frequency is fixed.

This application is based on the first implementation above.

As explained above, one application of particular interest is for NFC applications, but this application is not limited to this. The DC-DC converter can be embedded into the NFC transmitter circuitry. Examples enable the DC-DC converter noise frequency to be pushed outside the data communication bandwidth.

Figure 5:
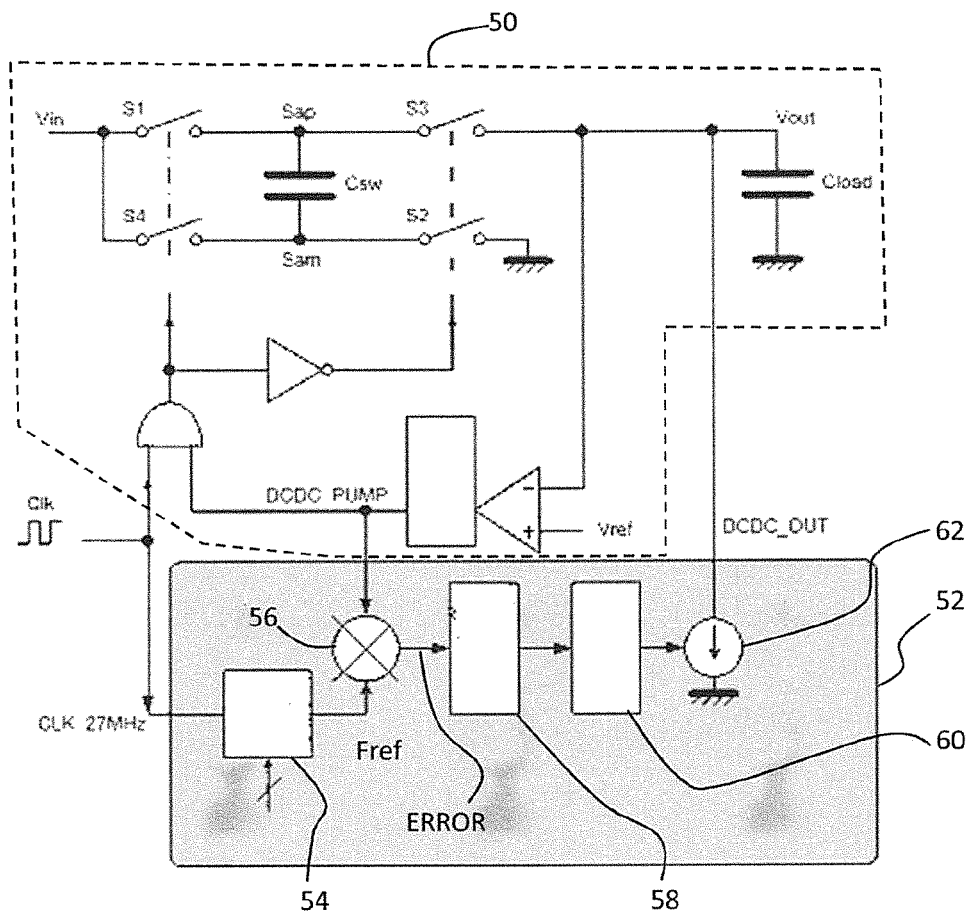
FIG. 5 shows an example of DC-DC converter circuit.

FIG. 5 shows an example of DC-DC converter and control circuit.

Figure 1:
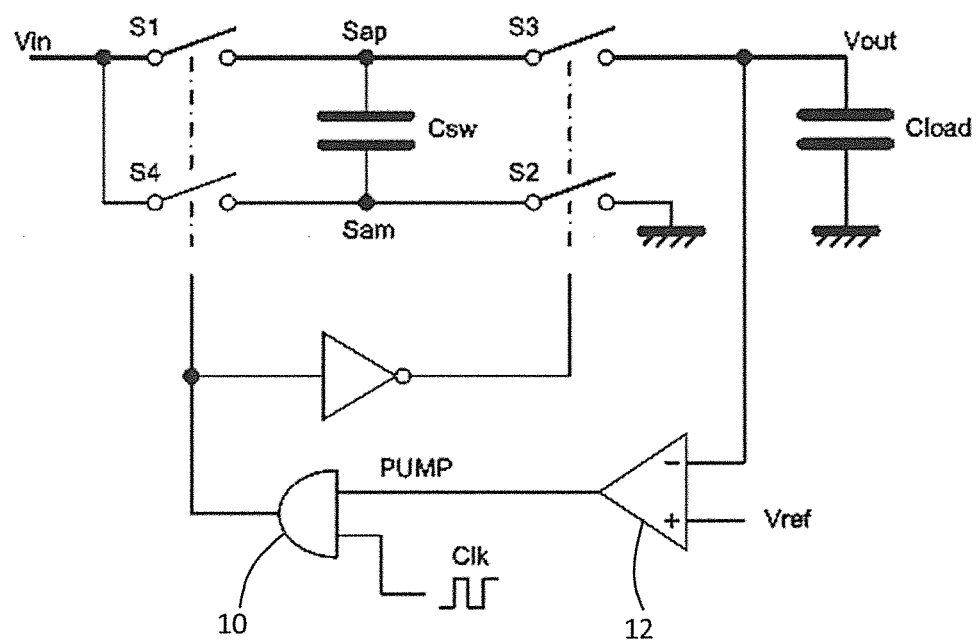
FIG. 1 shows a known DC-DC converter circuit.

The main DC-DC converter unit 50 corresponds to FIG. 1.

A phase locked loop 52 is provided for setting the DC-DC converter load current in order to force the DC-DC converter switching frequency, which as explained above is represented by the signal DCDC_PUMP, to be equal to a reference frequency (Fref).

An input frequency divider 54 is provided for setting the reference frequency as a division of the clock frequency, in this example 27 MHz.

A phase comparator 56 compares the DCDC_PUMP signal with this reference frequency, and the resulting error signal (ERROR) is provided to a charge pump 58. A loop filter 60 generates a control signal for controlling a voltage-controlled current source 62.

This is based on a common PLL structure, with a voltage controlled oscillator or current controlled oscillator replaced by a current source 62.

The charge pump sinks or sources current through the filter in response to the error message from the phase comparator 56. The filter then gives a reference voltage for the controlled current source.

The charge pump 58 is not a voltage boosting circuit.

Note that the voltage controlled current source 62 can be a single MOS transistor.

Figure 6:
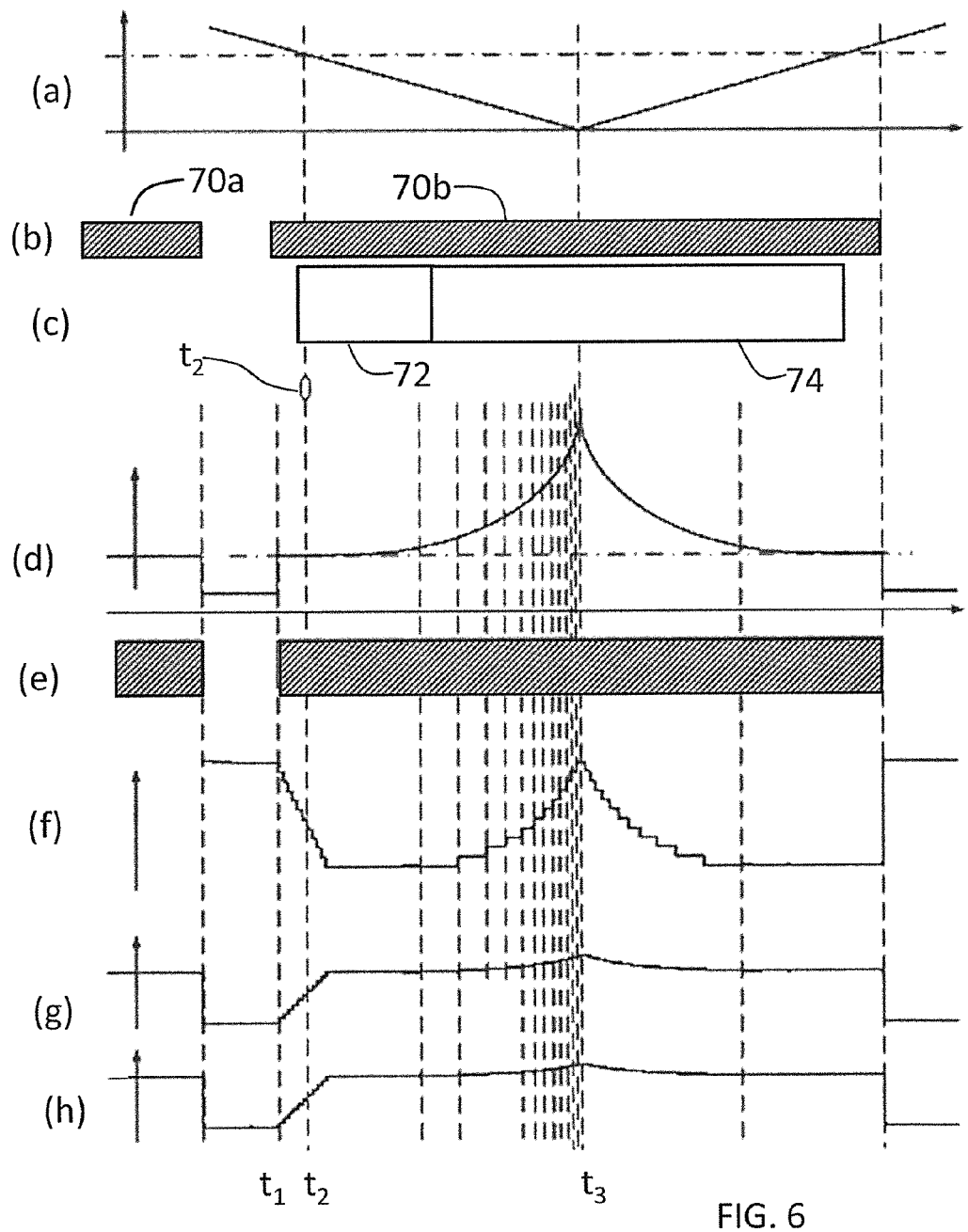
FIG. 6 shows timing diagrams for the circuit of FIG. 5.

The DC-DC converter switching frequency is sensed and compared to the reference clock signal. Their two phases are locked by controlling the current source 62 at the DC-DC output FIG. 6 is used to illustrate the operating sequence. For all plots, the x-axis is time.

FIG. 6(a) shows the distance between the transmitter antenna and the card. As shown, the card is brought into contact slowly and then moved away.

FIG. 6(b) shows the times at which the RF circuit is operated, as the hatched areas 70a and 70b.

The RF circuitry is operated at time 70a then turned off.

The card is introduced into the NFC field at time t1 and the RF circuitry is turned on. The transmitter circuit detects the card at time t2 and shares data with it.

As shown in FIG. 6(c), the initial time 72 following time t2 is a card identification time period, which is then followed by data exchange time period 74.

FIG. 6(d) shows the current consumption. With no card present, there is a certain level of current consumption when the RF circuitry is active, and this drops when the RF circuitry is not active.

FIG. 6(e) shows the times when the DC-DC converter circuit is active, which is in synchronism with the activation of the RF circuitry.

As shown in FIG. 6(d), once dialogue with the card is started, the current consumption rises as the card is brought closer.

FIG. 6(f) shows the voltage controlled current source output level, corresponding to the effective programmable output resistance. The output current rises as the card is brought closer, and this causes the increased current consumption.

FIG. 6(g) shows how the DC-DC converter switching frequency remains substantially constant once it has reached its controlled reference, during the card identification phase. In this way, the DC-DC switching frequency is controlled in a way which results in a stable overall DC-DC converter load current. The resulting battery current consumption shown in FIG. 6(h) is also substantially constant during the dialogue time period.

After the card is at the closest point at time t3, the card is removed from the field, with an increasing distance. During this time, the current consumption from the NFC transmitter decreases, and the internal resistive load is decreased in order to hold the stable overall DC-DC converter load current.

For NFC applications, stable RF performance can be obtained for varying pressure and temperature conditions. The DC-DC converter switching noise frequency is made stable. This enables better integration into an end customer application as the programmable DC-DC switching noise can be pushed away from an unwanted frequency range.

Pushing the DC-DC converter switching frequency above 1 MHz is technically feasible which is of particular interest for such NFC applications. This also means that frequency components derived from the individual phases P2 and P3 are also pushed out of the band of interest.

The invention also means the DC-DC overall current consumption is made stable whatever the DC-DC converter load current.

A single example of simple charge pump circuit has been provided. However, the invention can be applied more generally. Essentially, the invention can be applied to converter circuits which switch between an output stage (i.e. a set of charge pumping cycles) and a hold stage (i.e. with no charge pumping cycles). This switching between stages gives rise to a frequency component at the output, which can cause noise. The examples above are based on the recognition that this switching frequency can be used as a feedback control parameter.

The invention can be applied to all topologies of capacitive DC-DC converter. The example given is a voltage doubler topology (VOUT (max)=2*VIN) based on only one switching capacitor (Csw in FIG. 1). Other topologies can be used, including voltage doubler, voltage tripler, divider by 2, divider by 3 etc.

The invention has also been described in connection with NFC communications equipment. However, the invention applies more generally to the idea of avoiding interference with a particular frequency of interest (which can be any RF frequency), by controlling the converter switching frequency.

Various other modifications will be apparent to those skilled in the art.

The invention claimed is:

1. A DC-DC converter, comprising:
   a capacitor arrangement;
   a switching arrangement for controlling coupling of the capacitor arrangement to a converter input during a loading phase and to a converter output during a storing phase;
   a circuit for controlling the switching arrangement to alternate the loading and storing phases during an output charge stage and to cease, in response to a voltage on the converter output, alternation between the loading and storing phases during an output hold stage, the cycling between stages giving rise to a converter switching frequency;
   a variable output load configured to vary an output load on the converter output and to source current during at least the output hold stage; and
   a feedback circuit for controlling the variable output load using the switching frequency as a feedback control parameter thereby to maintain the converter switching frequency at a desired frequency.

2. A converter as claimed in claim 1, wherein the feedback circuit comprises a phase locked loop circuit.

3. A converter as claimed in claim 2, wherein the phase locked loop circuit comprises a phase comparator for comparing a signal which varies in dependence on the converter switching frequency with a reference frequency signal, to derive a control signal for controlling the variable output load.

4. A converter as claimed in claim 3, wherein the signal which varies in dependence on the converter switching frequency comprises a pump control signal which indicates whether or not the converter output has reached a target value.

5. A converter as claimed in claim 4, comprising a divider circuit for deriving the reference frequency signal from a clock signal, wherein the clock signal controls the switching arrangement when enabled by the pump control signal.

6. A converter as claimed in claim 1, wherein the variable output load comprises a voltage controlled current source in parallel with the output load of the converter.

7. An RF communications circuit, comprising:
   a receiver and/or transmitter circuit; and
   a converter as claimed in claim 1 for providing the power supply for the receiver and/or transmitter circuit from a battery.

8. An RF communications circuit as claimed in claim 7, wherein the receiver and/or transmitter circuit comprises a near field communication circuit.

9. An RF communications circuit as claimed in claim 8, wherein the receiver and/or transmitter circuit operate in a frequency range, and wherein the converter switching frequency is outside the frequency range.

10. An RF communications circuit as claimed in claim 9, wherein the frequency range is 100 kHz to 1 Mhz.

11. The converter of claim 1, wherein the feedback circuit is configured to controlling the variable output load in response to an output current at the converter output.

12. A DC-DC conversion method, comprising:
    coupling of a capacitor arrangement to a converter input during a loading phase and to a converter output during a storing phase;
    alternating the loading and storing phases during an output charge stage;
    ceasing, in response to a voltage on the converter output, alternation between the loading and storing phases during an output hold stage, wherein cycling between the stages gives rise to a converter switching frequency;
    controlling, using the switching frequency as a feedback control parameter, a variable output load that sources current during at least the hold stage, thereby to maintain the converter switching frequency at a desired frequency.

13. A method as claimed in claim 12, comprising comparing a signal which varies in dependence on the converter switching frequency with a reference frequency signal, and deriving a control signal for controlling the variable output load.

14. A method as claimed in claim 13, wherein the signal which varies in dependence on the converter switching frequency comprises a pump control signal which indicates whether or not the converter output has reached a target value.

15. A method as claimed in claim 14, comprising deriving the reference frequency signal from a clock signal, wherein the clock signal controls the switching arrangement when enabled by the pump control signal.

16. A method as claimed in claim 12, wherein controlling a variable output load comprises controlling a voltage controlled current source in parallel with the output load of the converter.

17. The method of claim 12, wherein the alternating the loading and storing phases during an output charge stage occurs at a constant frequency set by a clock signal.

18. The method of claim 17, wherein the ceasing alternation between the loading and storing phases during an output hold stage occurs in response to the voltage on the converter output exceeding a reference voltage plus a hysteresis voltage and further comprising resuming alternation in response to the voltage on the converter output being less than the reference voltage.

* * * * *